US012692911B1

(12) United States Patent
Jennings et al.

(10) Patent No.: US 12,692,911 B1
(45) Date of Patent: Jul. 28, 2026

(54) WET CLUTCH

(71) Applicant: DEERE & COMPANY, Moline, IL (US)

(72) Inventors: Kyle A. Jennings, Wichita, KS (US); Blake E. White, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/178,108

(22) Filed: Apr. 14, 2025

(51) Int. Cl.
F16D 25/12 (2006.01)

(52) U.S. Cl.
CPC ................................. F16D 25/123 (2013.01)

(58) Field of Classification Search
CPC .... F16H 13/52; F16H 25/123; F16H 25/0638; F16H 2069/004
See application file for complete search history.

(56) References Cited

U.S. PATENT DOCUMENTS

| | | | |
|---|---|---|---|
| 5,295,909 | A | 3/1994 | Heidenreich |
| 6,401,878 | B1 * | 6/2002 | Harada ................... F16D 65/04 |
| | | | 188/77 R |
| 8,475,319 | B2 | 7/2013 | Forssberg |
| 9,022,183 | B2 | 5/2015 | Bill |
| 10,955,009 | B2 | 3/2021 | Francis et al. |
| 11,401,980 | B2 | 8/2022 | Seki et al. |
| 2015/0354649 | A1 | 12/2015 | Forssberg |
| 2017/0002873 | A1 * | 1/2017 | Neumann ............... F16D 13/72 |

FOREIGN PATENT DOCUMENTS

| | | | | |
|---|---|---|---|---|
| CN | 111486183 | A * | 8/2020 | ......... F16D 25/0638 |
| CN | 120332364 | A * | 7/2025 | ............. F16D 69/02 |
| DE | 102021112150 | A1 * | 11/2022 | ............. F16D 13/52 |
| EP | 0267027 | B1 | 5/1991 | |
| JP | 2003056614 | A * | 2/2003 | .......... F16D 13/648 |
| KR | 20240122850 | A * | 8/2024 | ............. F16D 13/52 |
| WO | WO-2011111117 | A1 * | 9/2011 | .......... F16D 13/648 |

* cited by examiner

*Primary Examiner* — Stacey A Fluhart

(57) ABSTRACT

A wet clutch includes a first friction disk including a first friction material having a first arrangement of cooling channels with a first fluid distribution, a second friction disk including a second friction material having a second arrangement of cooling channels with a second fluid distribution, the second arrangement of cooling channels being different from the first arrangement of cooling channels, and a separator disk positioned between the first and second friction disks.

11 Claims, 5 Drawing Sheets

150

152

110

150

130

150

152

100

WET CLUTCH

FIELD OF THE DISCLOSURE

The present disclosure relates to a wet clutch.

BACKGROUND

A wet clutch can include multiple clutch disks each having friction material. The friction material can include a pattern of grooves which allows a lubricating or cooling fluid to flow across the friction material within the pattern of grooves. The fluid can flow from the inner diameter of the clutch disk to the outer diameter transferring heat away from the friction material.

SUMMARY

According to an aspect of the present disclosure, a wet clutch includes a first friction disk including a first friction material having a first arrangement of cooling channels with a first fluid distribution, a second friction disk including a second friction material having a second arrangement of cooling channels with a second fluid distribution, the second arrangement of cooling channels being different from the first arrangement of cooling channels, and a separator disk positioned between the first and second friction disks.

According to an aspect of the present disclosure, the second arrangement of cooling channels includes a larger flow rate than the first arrangement of cooling channels.

According to an aspect of the present disclosure, the second arrangement of cooling channels includes a larger quantity of channels than the first arrangement of cooling channels.

According to an aspect of the present disclosure, the second arrangement of cooling channels includes a larger surface area than the first arrangement of cooling channels.

According to an aspect of the present disclosure, the second arrangement of cooling channels includes deeper channels than the first arrangement of cooling channels.

According to an aspect of the present disclosure, the second arrangement of cooling channels includes wider channels than the first arrangement of cooling channels.

According to an aspect of the present disclosure, the first friction material includes a first set of channels and a second set of channels different from the first set of channels.

According to an aspect of the present disclosure, the second friction material is different from the first friction material.

According to an aspect of the present disclosure, the second friction material is the same as the first friction material.

According to an aspect of the present disclosure, the first arrangement of cooling channels includes a first flow rate less than a preselected overall flow rate, the second arrangement of cooling channels includes a second flow rate greater than the preselected overall flow rate, which results in the combined first and second flow rates attaining the preselected overall flow rate.

According to an aspect of the present disclosure, a work vehicle includes a wet clutch as disclosed herein.

The above and other features will become apparent from the following detailed description and accompanying drawings.

BRIEF DESCRIPTION OF THE DRAWINGS

The detailed description of the drawings refers to the accompanying figures in which.

Like reference numerals are used to indicate like elements throughout the figures.

DETAILED DESCRIPTION

Figure 1:
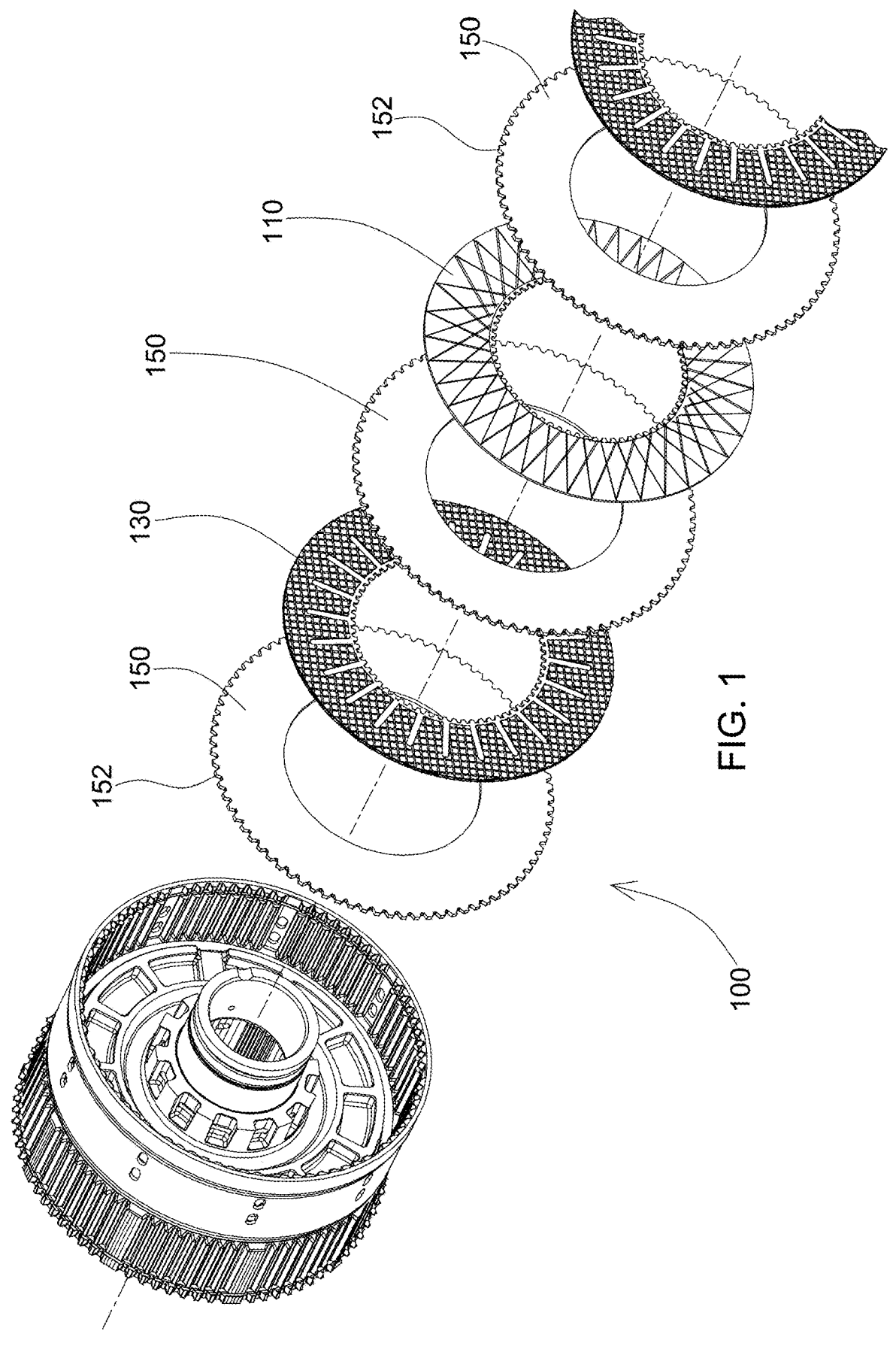
FIG. 1 is a perspective view of a wet clutch, according to an implementation.
Figure 2:
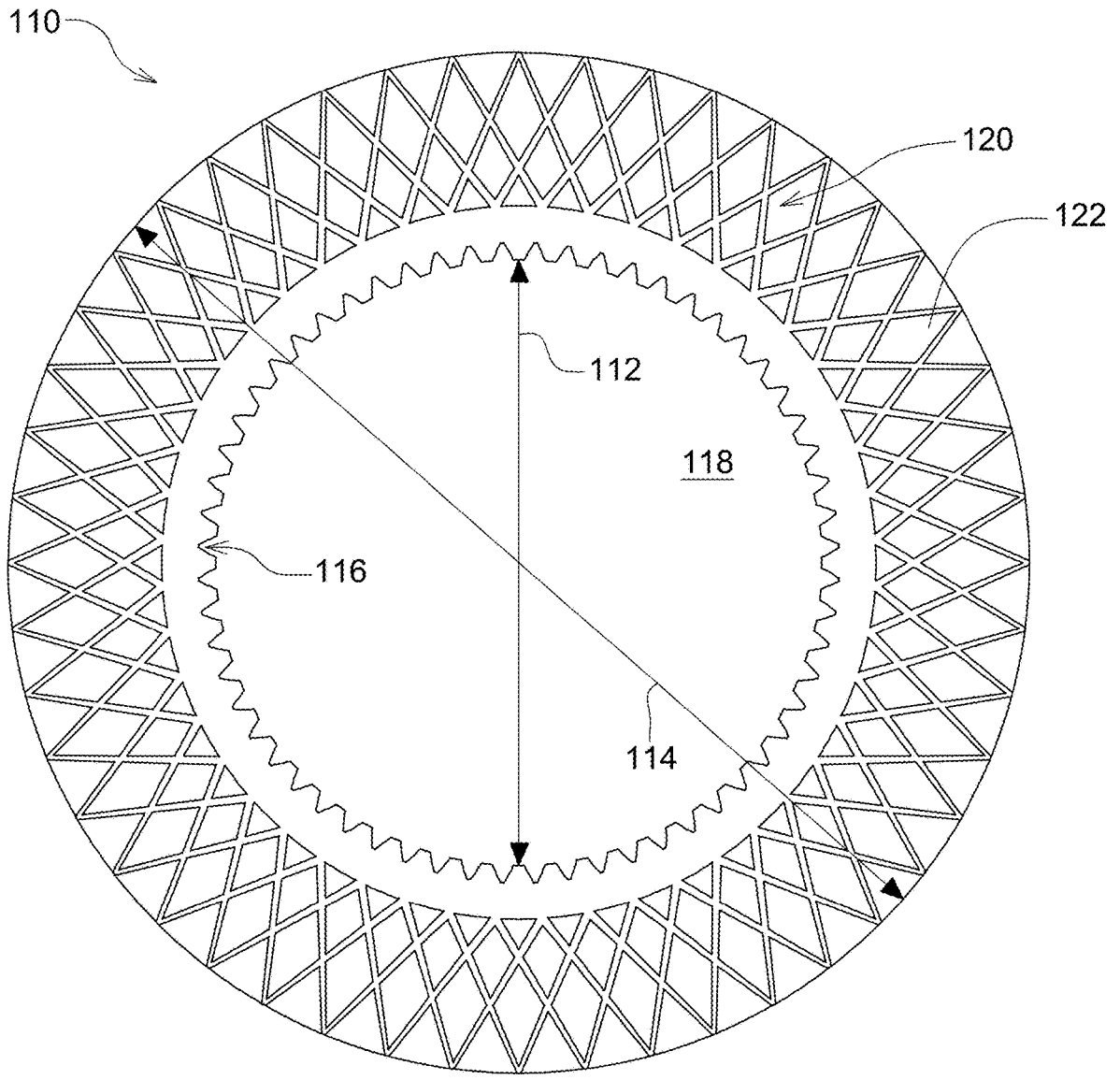
FIG. 2 is a front view of a friction disk, according to an implementation.
Figure 3:
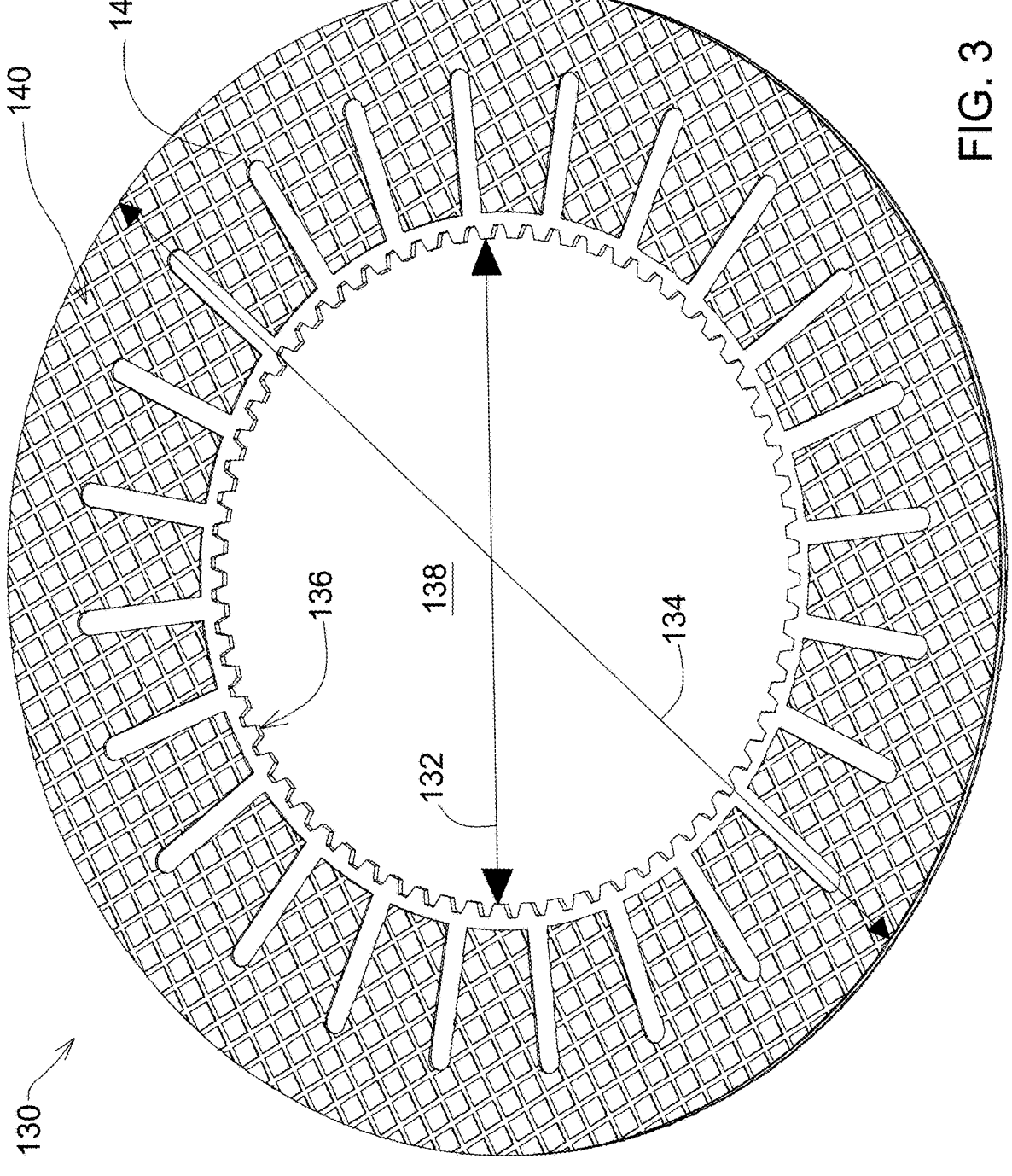
FIG. 3 is a front view of a friction disk, according to an implementation.
Figure 4:
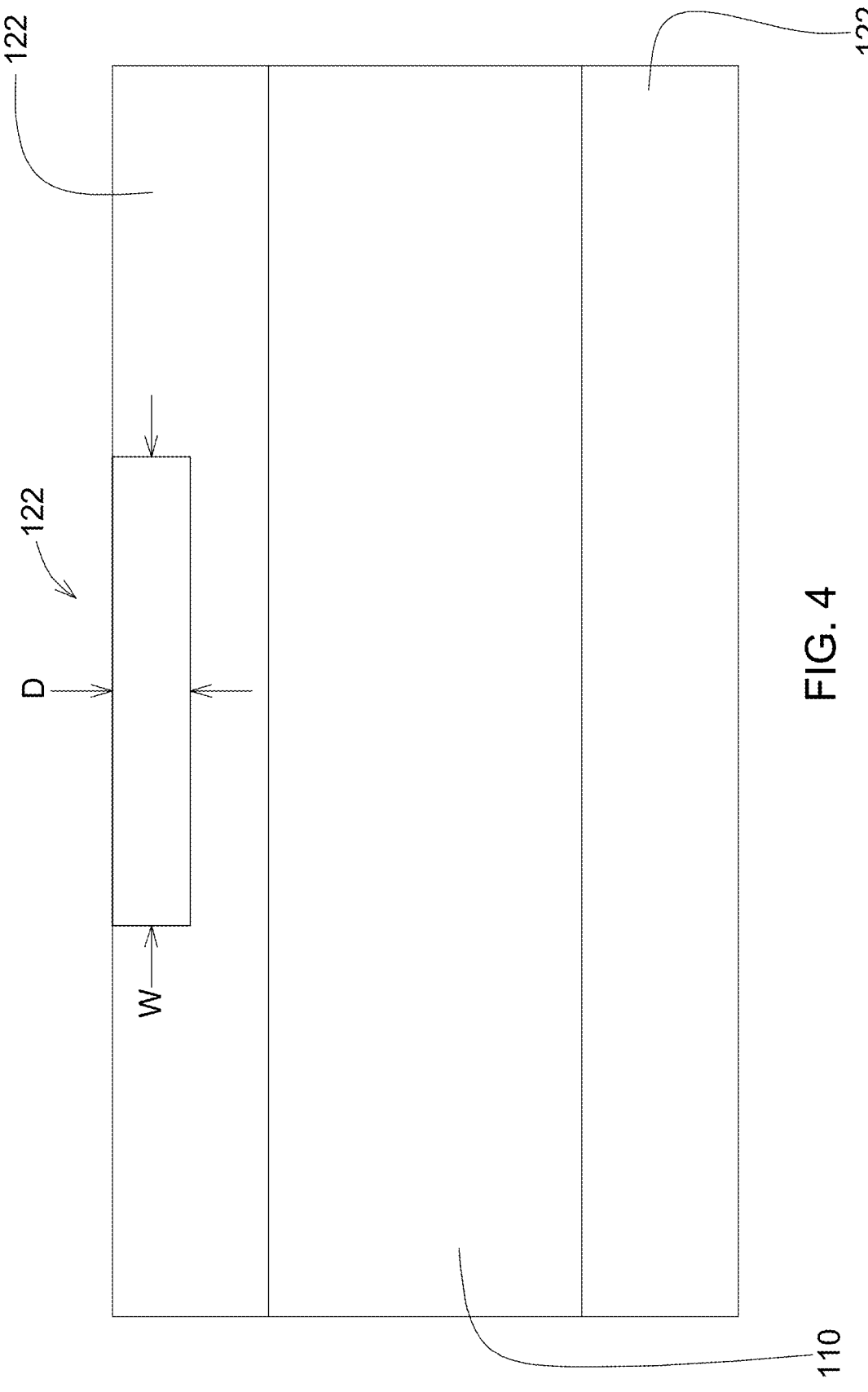
FIG. 4 is a partial cross-section of a friction disk, according to an implementation.
Figure 5:
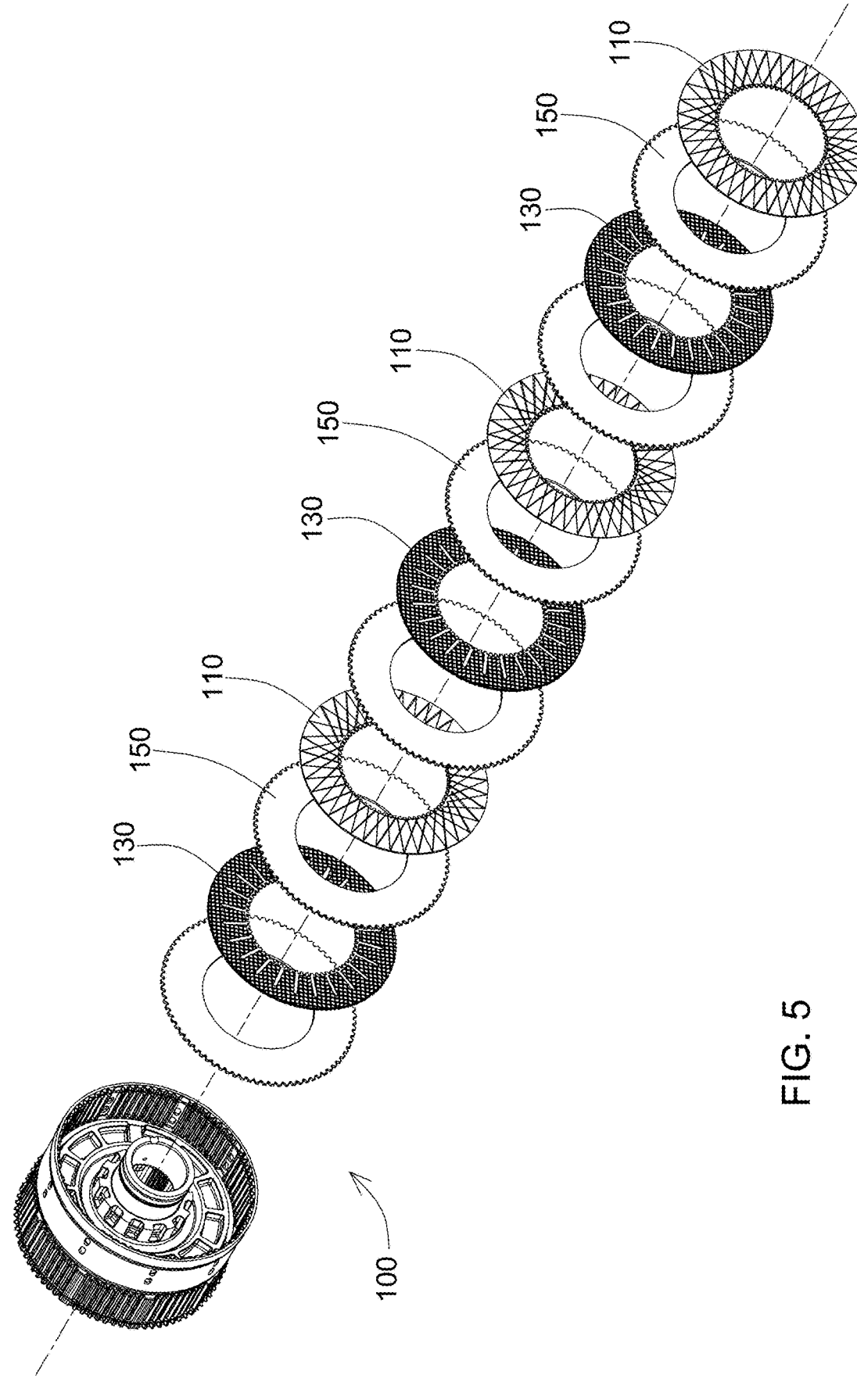
FIG. 5 is a perspective view of a wet clutch, according to an implementation.

The implementations disclosed in the above drawings and the following detailed description are not intended to be exhaustive or to limit the disclosure to these implementations.

With reference to the FIGURES, a wet clutch 100 can be used in a drivetrain of a work vehicle, for example in agriculture, construction, forestry, and road building. The wet clutch 100 can include a first friction disk 110, a second friction disk 130, and one or more disk plates or separator disks 150. The wet clutch 100 can include a combination of one or more first friction disks 110, one or more second friction disks 130, and one or more separator disks 150 forming a clutch pack.

The first friction disk has an inner diameter 112 and an outer diameter 114. The first friction disk 110 includes an opening 118 in the center. The first friction disk 110 can include splines or teeth 116 on the inner diameter 112, the outer diameter 114, or both. The first friction disk 110 includes a first friction material 120 on one or both sides of the first friction disk 110. The first friction material 120 can include a first arrangement of cooling channels 122 in the surface of the first friction material 120.

The first arrangement of cooling channels 122 can include a preselected channel or groove pattern in the first friction material 120, a preselected channel or groove depth D below the surface of the first friction material 120, and a preselected width W of the cooling channels 122. The preselected channel or groove pattern can include any number of channels or grooves in any layout or arrangement. The preselected depth D can be constant or can vary. The preselected width W can be constant or can vary. The first arrangement of cooling channels 122 can include a first set of channels or grooves having a first preselected channel or groove pattern, a first preselected depth D, and a first preselected width W and a second set of channels or grooves having a second preselected channel or groove pattern, a second preselected depth D, and a second preselected width W.

The first arrangement of cooling channels 122 generates a first fluid distribution when the wet clutch 100 is engaged. The first fluid distribution includes a flow path and a flow rate from the inner diameter 112 to the outer diameter 114 based on the preselected channel or groove pattern, the preselected depth D, and the preselected width W of the cooling channels 122. In some implementations, the first fluid distribution is based on two or more sets of channels or grooves of the first arrangement of cooling channels 122, which are different from each other.

The second friction disk 130 has an inner diameter 132 and an outer diameter 134. The second friction disk 130 includes an opening 138 in the center. The second friction disk 130 can include splines or teeth 136 on the inner diameter 132, the outer diameter 134, or both. The second friction disk 130 includes a second friction material 140 on one or both sides of the second friction disk 130. The second friction material 140 can be the same as or different from the first friction material 120. The second friction material 140 can include a second arrangement of cooling channels 142 in the surface of the second friction material 140.

The second arrangement of cooling channels 142 can include a preselected channel or groove pattern in the second friction material 140, a preselected channel or groove depth D below the surface of the second friction material 140, and a preselected width W of the cooling channels 142. The preselected channel or groove pattern can include any number of channels or grooves in any layout or arrangement. The preselected depth D can be constant or can vary. The preselected width W can be constant or can vary. The second arrangement of cooling channels 142 can include a first set of channels or grooves having a first preselected channel or groove pattern, a first preselected depth D, and a first preselected width W and a second set of channels or grooves having a second preselected channel or groove pattern, a second preselected depth D, and a second preselected width W. The first and second sets of channels or grooves of the second arrangement of cooling channels 142 can be different from the first and second sets of channels or grooves of the first arrangement of cooling channels 122.

The second arrangement of cooling channels 142 generates a second fluid distribution when the wet clutch 100 is engaged. The second fluid distribution includes a flow path and a flow rate from the inner diameter 132 to the outer diameter 132 based on the preselected channel or groove pattern, the preselected depth D, and the preselected width W of the cooling channels 142. In some implementations, the second fluid distribution is based on two or more sets of channels or grooves of the second arrangement of cooling channels 142, which are different from each other and different from the set or sets of channels or grooves of the first arrangement of cooling channels 122.

The one or more separator disks 150 include splines or teeth 152 on the inner or outer diameter in the opposite location as the splines or teeth 116, 136 on the first and second friction disks 110, 130. For example, the first and second friction disks 110, 130 include splines 116, 136 on the inner diameter 112, 132 and the one or more separator disks 150 include splines 152 on the outer diameter. The wet clutch 100 can include one or more disk plates or separator disks 150 positioned between the first and second friction disks 110, 130, and on either side of the first and second friction disks 110, 130.

According to some implementations, the second arrangement of cooling channels 142 can include a larger or smaller number or quantity of channels or grooves than the first arrangement of cooling channels 122. Alternatively, or additionally, the second arrangement of cooling channels 142 can include a larger or smaller surface area than the first arrangement of cooling channels 122. Alternatively, or additionally, the second arrangement of cooling channels 142 can include deeper or shallower channels or grooves than the first arrangement of cooling channels 122. Alternatively, or additionally, the second arrangement of cooling 142 channels can include wider or narrower channels than the first arrangement of cooling channels 122.

According to some implementations, the second arrangement of cooling channels 142 can have a different flow path than the first arrangement of cooling channels 122. The second arrangement of cooling channels 142 can have a different flow rate than the first arrangement of cooling channels 122. The second arrangement of cooling channels

142 can include a larger or smaller flow rate than the first arrangement of cooling channels 122. According to some implementations, when the second arrangement of cooling channels 142 provides the larger flow rate than the first arrangement of cooling channels 122, the second arrangement of cooling channels 142 can provide better fluid distribution and thus better cooling, and the first arrangement of cooling channels 122 can provide better clutch controllability and shift quality.

The wet clutch 100 can include a preselected overall flow rate through the clutch pack, from the inner diameters 112, 132 of the first and second friction disks 110, 130, through the first and second arrangements of cooling channels 122, 142, and out of the outer diameters 114, 134. The first arrangement of cooling channels 122 can provide a first flow rate above or below the preselected overall flow rate. The second arrangement of cooling channels 142 can provide a second flow rate above or below the preselected overall flow rate. The first and second flow rates are each selected so that the combined first and second flow rates generate the preselected overall flow rate. According to some implementations, the first arrangement of cooling channels 122 can provide a first flow rate below the preselected overall flow rate, and the second arrangement of cooling channels 142 can provide a second flow rate above the preselected overall flow rate, which results in the combined first and second flow rates attaining the preselected overall flow rate.

According to some implementations, the wet clutch 100 can include other friction disks in addition to the first and second friction disks 110, 130. Each of these other friction disks can include friction material with other arrangements of cooling channels different from the first and second arrangement of cooling channels 122, 142. For example, the wet clutch 100 could include a third friction disk having friction material with a third arrangement of cooling channels. The wet clutch 100 could include a clutch pack of the first, second, and third friction disks in alternating or any other arrangement. The wet clutch 100 can include any number of different arrangements of cooling channels.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

What is claimed is:

1. A wet clutch, comprising:
a plurality of first friction disks including a first friction material on both sides of each first friction disk, the first friction material having a first arrangement of cooling channels with a first fluid distribution, the first arrangement of cooling channels including a first set of channels having a varying depth and a varying width and a second set of channels having a varying depth and a varying width, the second set of channels being different from the first set of channels;
a plurality of second friction disks including a second friction material on both sides of each second friction disk, the second friction material having a second arrangement of cooling channels with a second fluid distribution, the second arrangement of cooling channels including a first set of channels and a second set of channels having different depths and different widths than the first and second sets of channels of the first arrangement, the second arrangement of cooling channels including a larger quantity of channels than the first arrangement of cooling channels, the second arrangement of cooling channels including deeper and wider channels than the first arrangement of cooling channels, the first arrangement of cooling channels including a first flow rate less than a preselected overall flow rate, the second arrangement of cooling channels including a second flow rate greater than the preselected overall flow rate, resulting in the combined first and second flow rates attaining the preselected overall flow rate, the plurality of first and second friction disks arranged in an other than alternating arrangement; and
a plurality of separator disks positioned between each of the plurality of first and second friction disks.

2. The wet clutch of claim 1, wherein the second friction material is different from the first friction material.

3. The wet clutch of claim 1, wherein the second friction material is the same as the first friction material.

4. The wet clutch of claim 1, further comprising:
a plurality of third friction disks including a third friction material on both sides of each third friction disk, the third friction material having a third arrangement of cooling channels with a third fluid distribution different from the first and second arrangements of cooling channels.

5. The wet clutch of claim 4, wherein the plurality of first, second, and third friction disks are arranged in an other than alternating arrangement.

6. A work vehicle including a wet clutch, comprising:
a plurality of first friction disks including a first friction material on both sides of each first friction disk, the first friction material having a first arrangement of cooling channels with a first fluid distribution, the first arrangement of cooling channels including a first set of channels having a varying depth and a varying width and a second set of channels having a varying depth and a varying width, the second set of channels being different from the first set of channels;
a plurality of second friction disks including a second friction material on both sides of each second friction disk, the second friction material having a second arrangement of cooling channels with a second fluid distribution, the second arrangement of cooling channels including a first set of channels and a second set of channels having different depths and different widths than the first and second sets of channels of the first arrangement, the second arrangement of cooling channels including a larger quantity of channels than the first arrangement of cooling channels, the second arrangement of cooling channels including deeper and wider channels than the first arrangement of cooling channels, the first arrangement of cooling channels including a first flow rate less than a preselected overall flow rate, the second arrangement of cooling channels including a second flow rate greater than the preselected overall flow rate resulting in the combined first and second flow rates attaining the preselected overall flow rate, the plurality of first and second friction disks arranged in an other than alternating arrangement; and
a plurality of separator disks positioned between each of the plurality of first and second friction disks.

7. The work vehicle of claim 6, wherein the second friction material is different from the first friction material.

8. The work vehicle of claim 6, wherein the second friction material is the same as the first friction material.

9. The work vehicle of claim 6, further comprising:
a plurality of third friction disks including a third friction material on both sides of each third friction disk, the third friction material having a third arrangement of cooling channels with a third fluid distribution different from the first and second arrangements of cooling channels.

10. The work vehicle of claim 9, wherein the plurality of first, second, and third friction disks are arranged in an other than alternating arrangement.

11. A wet clutch, comprising:
a plurality of first friction disks including a first friction material on both sides of each first friction disk, the first friction material having a first arrangement of cooling channels with a first fluid distribution, the first arrangement of cooling channels including a first set of channels having a varying depth and a varying width and a second set of channels having a varying depth and a varying width, the second set of channels being different from the first set of channels;
a plurality of second friction disks including a second friction material on both sides of each second friction disk, the second friction material being different from the first friction material, the second friction material having a second arrangement of cooling channels with a second fluid distribution, the second arrangement of cooling channels including a first set of channels and a second set of channels having different depths and different widths than the first and second sets of channels of the first arrangement, the second arrangement of cooling channels including a larger quantity of channels than the first arrangement of cooling channels, the second arrangement of cooling channels including deeper and wider channels than the first arrangement of cooling channels, the first arrangement of cooling channels including a first flow rate less than a preselected overall flow rate, the second arrangement of cooling channels including a second flow rate greater than the preselected overall flow rate, resulting in the combined first and second flow rates attaining the preselected overall flow rate;

a plurality of third friction disks including a third friction material on both sides of each third friction disk, the third friction material having a third arrangement of cooling channels with a third fluid distribution different from the first and second arrangements of cooling channels, the plurality of first, second, and third friction disks arranged in a non-alternating arrangement; and a plurality of separator disks positioned between each of the plurality of first, second, and third friction disks.

*   *   *   *   *